United States Patent

Hatsuda et al.

[11] Patent Number: 6,140,395
[45] Date of Patent: Oct. 31, 2000

[54] METHOD OF PRODUCING HYDROPHILIC RESIN

[75] Inventors: Takumi Hatsuda, Takasago; Koji Miyake; Akito Yano, both of Himeji, all of Japan

[73] Assignee: Nippon Shokubai Co., Ltd., Osaka, Japan

[21] Appl. No.: 09/215,156

[22] Filed: Dec. 18, 1998

[30] Foreign Application Priority Data

Dec. 25, 1997 [JP] Japan ................................. 9-358455

[51] Int. Cl.$^7$ ............................................. C08J 3/00
[52] U.S. Cl. ................................................. 523/319
[58] Field of Search .................................... 523/319

[56] References Cited

U.S. PATENT DOCUMENTS

| | | | |
|---|---|---|---|
| 3,905,122 | 9/1975 | Oshima | 34/17 |
| 4,690,788 | 9/1987 | Yada et al. | |
| 5,064,582 | 11/1991 | Sutton | 264/37 |
| 5,250,640 | 10/1993 | Irie | 526/88 |

FOREIGN PATENT DOCUMENTS

| | | |
|---|---|---|
| 0508810A2 | 4/1992 | European Pat. Off. . |
| 3717007 A1 | 12/1988 | Germany . |
| 2217232A | 10/1989 | United Kingdom . |
| WO 82/04449 | 12/1982 | WIPO . |
| WO 95/30485 | 11/1995 | WIPO . |

*Primary Examiner*—Paul R. Michl
*Attorney, Agent, or Firm*—Staas & Halsey LLP

[57] ABSTRACT

A method of producing hydrophilic resin by pulverizing and drying a hydrogel polymer, in which, during pulverization of the hydrogel polymer, the hydrogel polymer is sheared between two spiral rotary blades with different respective feed rates, provided opposite one another. Due to the difference in feed rates of the two rotary blades, one rotary blade overtakes the other, and the hydrogel polymer is caught therebetween and sheared. It is preferable if the temperature of the hydrogel polymer at this time is no less than 40° C.

27 Claims, 5 Drawing Sheets

METHOD OF PRODUCING HYDROPHILIC RESIN

FIELD OF THE INVENTION

The present invention relates to a method of producing hydrophilic resin, which may be suitably used for various purposes such as sanitary materials for disposable diapers and pads for incontinence, water-retaining materials for sandbags, materials for maintaining food freshness, and water-retaining materials for agriculture and gardening, in which method lumps of a hydrogel polymer having high adhesion and elasticity are pulverized without kneading and crushing.

BACKGROUND OF THE INVENTION

In recent years, water-absorbent resin, which is a type of hydrophilic resin, has been widely used as, for example, a constituent material of sanitary materials for disposable diapers, sanitary napkins, pads for incontinence, etc., in order to prevent contamination of clothing, etc., by bodily fluids such as urine and blood, by absorbing and retaining these bodily fluids.

Further, recently, in order to make such sanitary materials thinner and improve their performance, the trend is to decrease the amount of fiber base materials (such as pulp) and increase the amount of water-absorbent resin used therein. Accordingly, further improvement of the water absorbing performance of such water-absorbent resin is needed.

Such water-absorbent resins can be obtained by polymerizing monomers such as acrylic acid, sodium acrylate, etc. in an aqueous solution in the presence of a crosslinking agent, yielding lumps of a hydrogel polymer, which are pulverized to a suitable particle size, dried, and then further pulverized as necessary.

One conventional method of pulverizing the foregoing hydrogel polymer is pulverizing by feeding between a two-shaft roller-type cutter.

However, when pulverizing the hydrogel polymer using the foregoing conventional method, even if the foregoing hydrogel polymer is fed into the roller-type cutter, it is not easy to bite into the hydrogel polymer, because it is a semi-solid gel having elasticity, and the hydrogel polymer may be kneaded during pulverizing. For this reason, if the foregoing conventional method is used, the hydrogel polymer is subject to great mechanical external force, and there are cases in which, for example, crosslinked polymer chains are broken, thus increasing the content of water-soluble components therein.

Further, in order to improve the water absorbing performance (especially absorbing capacity and absorption rate) of the water-absorbent resin, the foregoing hydrogel polymer is often made to contain bubbles by polymerizing the constituent monomers in an aqueous solution in the presence of a crosslinking agent. In this case, with the foregoing conventional pulverization method, the bubbles contained in the hydrogel polymer are squashed and reduced in number. Accordingly, in a water-absorbent resin obtained in this way, since the reduced number of bubbles leads to decreased surface area, it may not be possible to ensure sufficient liquid infiltration spaces necessary for movement of the aqueous liquid, thus impairing permeability to and dispersion of the aqueous liquid. For this reason, a problem with water-absorbent resins obtained by the conventional methods is that, during the production process, not only is the content of water-soluble components increased, but performance, such as absorbing capacity, is also impaired. These problems are not limited to water-absorbing resins, but are common to all hydrophilic resins.

SUMMARY OF THE INVENTION

The present invention was created in view of the foregoing problems with the conventional methods, and it is an object hereof to provide a method of producing hydrophilic resin which, by pulverizing a hydrogel polymer with minimal kneading and crushing, is capable of obtaining a hydrophilic resin having few water-soluble components and having superior performance, such as absorbing capacity.

As a result of close investigations to attain the foregoing object, the present inventors discerned that, by pulverizing a hydrogel polymer by shearing between two spiral rotary blades with different feed rates, provided opposite one another, kneading and crushing during pulverization of the hydrogel polymer could be held to a minimum, and a hydrophilic resin having few water-soluble components and having superior performance, such as absorbing capacity, could be easily produced. Thus the present invention was completed.

In other words, in order to attain the foregoing object, the method according to the present invention is a method of producing hydrophilic resin by pulverizing and drying a hydrogel polymer, and includes the step of pulverizing the hydrogel polymer by shearing between two spiral rotary blades with different respective feed rates, provided opposite one another.

With the foregoing method, the hydrogel polymer gets in between the two spiral rotary blades with different respective feed rates, and, due to the feed effect thereof, is easily fed into the rotary blades. Further, with the foregoing method, due to the different respective feed rates of the rotary blades, one rotary blade overtakes the other, and the hydrogel polymer is caught therebetween and sheared. For this reason, with the foregoing method, the hydrogel polymer can be pulverized by shearing, thus holding kneading and crushing to a minimum. Accordingly, with the foregoing method, a hydrophilic resin having few water-soluble components and having superior performance, such as absorbing capacity, can be easily obtained.

Additional objects, features, and strengths of the present invention will be made clear by the description below. Further, the advantages of the present invention will be evident from the following explanation in reference to the drawings.

DESCRIPTION OF THE EMBODIMENTS

In what follows, one embodiment of the present invention will be explained in detail with reference to FIGS. 1 through 4. The method of producing hydrophilic resin according to the present invention is a method which, by pulverizing a hydrogel polymer with minimal kneading and crushing, is capable of producing a hydrophilic resin with low water-soluble component content, and having superior performance, such as absorbing capacity. For this purpose, in the present invention, the hydrogel polymer is pulverized by shearing between two spiral rotary blades with different respective feed rates, provided opposite one another.

The foregoing hydrogel polymer to be pulverized in the present invention is a hydrogel polymer obtained, for example, by polymerization of monomer substances including a water-soluble, ethylenically unsaturated monomer in the presence of, as necessary, a crosslinking agent. The foregoing hydrophilic resin according to the present invention can be obtained by pulverizing, drying, and, as needed, further pulverizing of the foregoing hydrogel polymer. A specific example of a hydrophilic resin according to the present invention is a resin made of a water-soluble, ethylenically unsaturated monomer which has an internal crosslinked structure, and which is partially neutralized, for example, a water-absorbent resin.

The ethylenically unsaturated monomer used as raw material for the foregoing hydrogel polymer is a water-soluble monomer. Specific examples of such monomers include monomers containing acid groups, such as (meth)acrylic acid, β-acryloyloxypropionic acid, maleic acid, maleic anhydride, fumaric acid, crotonic acid, itaconic acid, cinnamic acid, 2-(meth)acryloylethanesulfonic acid, 2-(meth)acryloylpropanesulfonic acid, 2-(meth)acrylamido-2-methylpropanesulfonic acid, vinylsulfonic acid, styrenesulfonic acid, allylsulfonic acid, vinylphosphonic acid, 2-(meth)acryloyloxyethyl phosphate and (meth)acryloxyalkanesulphonic acid, and alkaline metal salts, alkaline earth metal salts, ammonium salts, and alkyl amine salts thereof; dialkylaminoalkyl (meth)acrylates, such as N,N-dimethylaminoethyl (meth)acrylate, N,N-dimethylaminopropyl (meth)acrylate and N,N-dimethylaminopropyl (meth)acrylamide, and quaternary compounds thereof (for example, a product of a reaction with alkyl hydride, a product of a reaction with dialkyl sulfate, etc.); dialkylaminohydroxyalkyl (meth)acrylates and quaternary compounds thereof; N-alkylvinylpyridinium halide; hydroxyalkyl (meth)acrylates, such as hydroxymethyl (meth)acrylate, 2-hydroxyethyl (meth)acrylate, and 2-hydroxypropyl (meth)acrylate; acrylamide, methacrylamide, N-ethyl (meth)acrylamide, N-n-propyl (meth)acrylamide, N-isopropyl (meth)acrylamide, and N,N-dimethyl (meth)acrylamide; alkoxypolyethylene glycol (meth)acrylates and polyethylene glycol mono(meth)acrylates, such as 2-hydroxyethyl (meth)acrylate, 2-hydroxypropyl (meth)acrylate and methoxypolyethylene glycol (meth)acrylate; vinylpyridine, N-vinylpyridine, N-vinylpyrrolidone, and N-acryloyl piperidine; and N-vinylacetamide. A single one of the foregoing ethylenically unsaturated monomers may be used alone, or two or more may be used in combination.

Among the foregoing examples of ethylenically unsaturated monomers, monomers containing an acrylic acid salt monomer as chief constituent are preferred because absorption characteristics and safety of the resulting hydrogel polymer can be further improved. Here, "acrylic acid salt monomer" means acrylic acid and/or water-soluble salts thereof. Further, water-soluble salts of acrylic acid are alkaline metal salts, alkaline earth metal salts, ammonium salts, hydroxy ammonium salts, amine salts and alkyl amine salts of acrylic acid having a neutralization ratio within a range from 30% to 100% by mole, preferably from 50% to 99% by mole; among these, sodium salts and potassium salts are especially preferred. A single one of the foregoing acrylic acid salt monomers may be used alone, or two or more may be used in combination. Incidentally, the average molecular weight (degree of polymerization) of the hydrophilic resin is not limited to any particular average molecular weight.

Further, the monomer substances may also include, to an extent that does not substantially interfere with the hydrophilic nature of the resultant hydrogel polymer, other monomers which are copolymerizable with the ethylenically unsaturated monomer (copolymerizable monomers). Specific examples of such copolymerizable monomers include (meth)acrylic esters such as methyl (meth)acrylate, ethyl (meth)acrylate, and butyl (meth)acrylate; and hydrophobic monomers such as vinyl acetate and vinyl propionate. A single one of the foregoing copolymerizable monomers may be used alone, or two or more may be used in combination.

Specific examples of the crosslinking agent which may be used as necessary when polymerizing the foregoing monomer substances include compounds having in their molecular structure a plurality of vinyl groups, and compounds having in their molecular structure a plurality of functional groups capable of reacting with carboxyl groups, sulfonic groups, etc.

Specific examples of compounds having in their molecular structure a plurality of vinyl groups include N,N'-methylene bis(meth)acrylamide, (poly)ethylene glycol di(meth)acrylate, (poly)propylene glycol di(meth)acrylate, trimethylolpropane tri(meth)acrylate, trimethylolpropane di(meth)acrylate, glycerin tri(meth)acrylate, glycerin acrylate methacrylate, ethylene oxide denaturated trimethylolpropane tri(meth)acrylate, pentaerythritol tetra(meth)acrylate, dipentaerythritol hexa(meth)acrylate, N,N-diallylacrylamide, triallyl cyanurate, triallyl isocyanurate, triallyl phosphate, triallylamine, dialyloxyacetic acid, N-methyl-N-vinylacrylamide, bis(N-vinylcarboxyamide), and poly(meth)allyloxyalkanes such as tetraallyloxyethane.

Specific examples of compounds having in their molecular structure a plurality of functional groups capable of reacting with carboxyl groups, sulfonic groups, etc. include polyhydric alcohol compounds, such as (poly)ethylene glycol, diethylene glycol, triethylene glycol, tetraethylene glycol, propylene glycol, 1,3-propanediol, dipropylene glycol, 2,2,4-trimethyl-1,3-pentanediol, polypropylene glycol, (poly)glycerin, 2-butene-1,4-diol, 1,4-butanediol, 1,5-pentanediol, 1,6-hexanediol, 1,2-cyclohexane-dimethanol, 1,2-cyclohexanol, trimethylolpropane, diethanolamine, triethanolamine, polyoxypropylene, oxyethylene-oxypropylene block copolymer, pentaerythritol, and sorbitol; epoxy compounds, such as (poly)ethylene glycol diglycidyl ether, (poly)glycerol polyglycidyl ether, diglycerol polyglycidyl ether, (poly)propylene glycol diglycidyl ether, and glycidol; polyamine compounds such as ethylenediamine, diethylenetriamine, triethylenetetramine, tetraethylenepentamine, pentaethylenehexamine, polyamidepolyamine, and polyethylenimine, and condensates of these polyamines and haloepoxy compounds; compounds having two or more isocyanate groups, such as 2,4-tolylene diisocyanate and hexamethylene diisocyanate; compounds having two or more oxazoline groups, such as 1,2-ethylene bisoxazoline; silane coupling agents, such as γ-glycidoxypropyltrimethoxysilane and γ-aminopropyltrimethoxysilane; alkylene carbonate compounds, such as 1,3-dioxolan-2-one, 4-methyl-1,3- dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one; haloepoxy compounds, such as epichlorohydrin, epibromohydrin, and α-methylepichlorohydrin; and hydroxides and chlorides of polyvalent metals such as zinc, calcium, magnesium, aluminum, iron and zirconium.

The amount of crosslinking agent used is not limited to any particular amount, but is preferably within a range from 0.0001% to 10% by mole, more preferably from 0.001% to 1% by mole, with respect to the monomer component.

The method of producing the foregoing hydrogel polymer to be used in the present invention, i.e., the method of polymerizing the foregoing monomer substances, is not limited to any method in particular; various known conventional polymerization methods, such as bulk polymerization, precipitation polymerization, polymerization in an aqueous solution, and reversed-phase suspension polymerization, may be used. However, the method of polymerizing the foregoing monomer substances is preferably polymerization in an aqueous solution, in which an aqueous solution of the monomer substances is prepared, because, in this case, the absorption characteristics of the resultant hydrophilic resin can be improved, and polymerization can be controlled easily. When the polymerization method adopted is polymerization in an aqueous solution, polymerization may be performed while stirring the aqueous solution containing the monomer substances (hereinafter referred to as the "aqueous monomer solution"), or with the aqueous monomer solution at rest. Further, when polymerizing while stirring the aqueous monomer solution, stirring may be continued from the beginning of polymerization through the completion thereof, or stirring may be suspended during polymerization. When polymerizing with the aqueous monomer solution at rest, on the other hand, batch polymerization in a polymerization vessel, or continuous polymerization on a driven belt, may be performed. Among these options, it is preferable to perform continuous polymerization with the aqueous monomer solution at rest, by supplying the aqueous monomer solution to a driven belt.

A hydrogel polymer obtained by one of the foregoing polymerization methods is a semi-solid body having high elasticity, in the form of a gel, and is used in a dry powder form as a hydrophilic resin. However, hydrogel polymers obtained by the foregoing polymerization in an aqueous solution, or by bulk polymerization or precipitation polymerization, are gelatinous substances in the form of lumps, and thus the efficiency of drying is extremely poor. Accordingly, in order to improve the efficiency of drying, it is necessary to pulverize the hydrogel polymer to a suitable particle size. Again, reverse-phase suspension polymerization usually results in a hydrogel polymer in particulate form, but there are also cases in which part or all of the hydrogel polymer is a gelatinous substance in the form of lumps. Accordingly, in cases like the foregoing, application of the present invention is extremely effective. In other words, the present method is a method which, when it is necessary to pulverize a hydrogel polymer in producing a hydrophilic resin, pulverizes the hydrogel polymer with minimal kneading and crushing, and is thus capable of obtaining a hydrophilic resin having few water-soluble components and having superior performance, such as absorbing capacity.

In the present invention, when commencing polymerization, it is possible to use, for example, a polymerization initiator, or activation energy radiation such as radioactive rays, electron rays, ultraviolet rays, or electromagnetic rays. Specific examples of polymerization initiators include radical polymerization initiators, such as inorganic peroxides like sodium persulfate, ammonium persulfate, potassium persulfate, and hydrogen peroxide; organic peroxides like t-butyl hydroperoxide, benzoyl peroxide, and cumene hydroperoxide; and azo compounds like 2,2'-azobis(N,N'-dimethyleneisobutylamidine) and salts thereof, 2,2'-azobis(2-methylpropionamidine) and salts thereof, 2,2'-azobis(2-amidinopropane) and salts thereof, and 4,4'-azobis-4-cyano valeric acid. A single one of the foregoing polymerization initiators may be used alone, or two or more may be used in combination. When a peroxide is used as the polymerization initiator, redox polymerization may be performed using a reducing agent, such as sulfite, bisulfite, or L-ascorbic acid.

In the present invention, when the hydrogel polymer obtained by polymerization of the foregoing monomer substances is a water-absorbent resin, the hydrogel polymer preferably contains bubbles, because in this case, absorption characteristics can be improved.

With the method according to the present invention, the bubbles contained in the hydrogel polymer are not kneaded and crushed, and decrease of surface area due to decreased number of bubbles can be prevented. Thus a water-absorbent resin can be obtained which has superior absorption characteristics, such as absorption rate and absorbing capacity.

As the polymerization method for obtaining the foregoing hydrogel polymer containing bubbles, various known conventional methods may be used, such as polymerization in the presence of an azo initiator; polymerization using carbonate as a foaming agent (Japanese Unexamined Patent Publication Nos. 5-237378/1993 (Tokukaihei 5-237378) and 7-185331/1995 (Tokukaihei 7-185331)); polymerization performed by dispersing a water-insoluble foaming agent such as pentane or trifluoroethane in a monomer (U.S. Pat. Nos. 5,328,935 and 5,338,766); polymerization using a solid particulate foaming agent (Publication of International Patent Application No. WO96/17884); and polymerization performed while dispersing an inert gas in the presence of a surfactant.

When polymerizing the monomer substances in the presence of a crosslinking agent, in order to improve absorption characteristics of the resulting hydrophilic resin and effectively perform foaming using a foaming agent, it is particularly preferable to use, of the various polymerization methods mentioned above, polymerization in an aqueous solution. In this case, the concentration of the monomer substances in the aqueous monomer solution may be within a range from 10% to 90% by weight, but is preferably from 20% to 60% by weight. If the concentration of the monomer substances is less than 20% by weight, the content of water-soluble components in the resulting hydrophilic resin is increased, and, due to insufficient foaming by the foaming agent, it may not be possible to improve the absorption rate. On the other hand, if the concentration of the monomer substances exceeds 60% by weight, it may be difficult to control the reaction temperature and foaming by the foaming agent.

For the solvent for the aqueous monomer solution, a combination of water and a water-soluble organic solvent may be used. Specific examples of such an organic solvent include methyl alcohol, ethyl alcohol, acetone, dimethyl sulfoxide, ethylene glycol monomethyl ether, glycerin,

(poly)ethylene glycol, (poly)propylene glycol, and alkylene carbonate. A single one of these organic solvents may be used alone, or two or more may be used in combination.

The foaming agent may be a compound which is dispersible or soluble in the aqueous monomer solution. Specific examples of such foaming agents include volatile organic compounds, such as n-pentane, 2-methylbutane, 2,2-dimethylpropane, hexane, heptane, benzene, substituted benzene, chloromethane, chloroethane, chlorofluoromethane, 1,1,2-trichlorotrifluoroethane, methanol, ethanol, isopropanol, acetone, azodicarbonamide, azobisisobutyronitrile, barium azodicarboxylate, dinitrosopentamethylenetetramine, 4,4'-oxybis (benzenesulfonyl hydrazide), paratoluenesulfonyl hydrazide, diazoaminobenzene, N,N'-dimethyl-N,N'-dinitrosoterephthalamide, nitrourea, acetone-p-toluenesulfonyl hydrazone, p-toluenesulfonylazide, 2,4-toluenedisulfonyl hydrazide, p-methylurethane benzenesulfonyl hydrazide, trinitrosotrimethylenetriamine, p-toluenesulfonyl semicarbazide, oxalyl hydrazide, nitroguanidine, hydrazo dicarbonamide, trihydrazinotriamine, azobisformamide, benzenesulfonyl hydrazide, benzene-1,3-disulfonyl hydrazide, diphenylsulfone-3,3'-disulfonyl hydrazide, 4,4'-oxybis (benzenesulfonyl hydrazide), sulfone hydrazide, malonic acid and salts thereof, and carbamic acid and salts thereof; carbonates, such as sodium bicarbonate, ammonium carbonate, ammonium bicarbonate, ammonium nitrite, basic magnesium carbonate, and calcium carbonate; acrylic acid salts of azo compounds containing one or more amino groups, represented by general formulae (1) and (2) below; and dry ice.

(1)

(Here, $X_1$ and $X_2$ each independently represents an alkylene group having 1 to 4 carbon atoms, and $R_1$, $R_2$, $R_3$, $R_4$, $R_5$, and $R_6$ each independently represents a hydrogen atom, an alkyl group having 1 to 4 carbon atoms, an aryl group, an allyl group or a benzyl group.)

(2)

(Here, $X_3$ and $X_4$ each independently represents an alkylene group having 1 to 4 carbon atoms, $X_5$ and $X_6$ each independently represents an alkylene group having 2 to 4 carbon atoms, and $R_7$ and $R_8$ each independently represents a hydrogen atom or an alkyl group having 1 to 4 carbon atoms.)

When a carbonate such as sodium carbonate is used as the foaming agent, it is preferable to also use a surfactant or dispersant. By using a surfactant or dispersant, it is possible to prevent the average diameter of the bubbles in the resulting hydrogel polymer from becoming too large, and the absorption rate from being lowered.

A single one of the foregoing foaming agents may be used alone, or two or more may be used in combination. Among the foregoing examples of foaming agents, acrylic acid salts of azo compounds containing one or more amino groups are preferred. Such an acrylic acid salt of an azo compound containing one or more amino groups has superior dispersibility with respect to acrylic acid salt monomers, and functions both as foaming agent and as radical polymerization initiator. Thus, such an acrylic acid salt can be uniformly dispersed in the aqueous monomer solution while at rest, while maintaining a predetermined average particle diameter, without using a surfactant or a dispersion stabilizing agent such as a water-soluble polymer, and without stirring the aqueous monomer solution. Moreover, such an acrylic acid salt does not cause sedimentation, flotation or separation. Accordingly, by polymerizing the monomers in the presence of an acrylic acid salt of an azo compound containing one or more amino groups, a hydrophilic resin (water-absorbent resin) can be obtained which has an even lower content of water-soluble components, and of residual monomers.

In the present invention, the foaming agent may be added to the aqueous monomer solution before polymerization or during polymerization, or may be added to the hydrogel polymer resulting from polymerization of the aqueous monomer solution. Further, a foaming agent prepared in advance may be added to the aqueous monomer solution, or a foaming agent may be prepared in the aqueous monomer solution by dissolving a foaming agent precursor therein, and then adding, as needed, carbon dioxide gas or acrylic acid salt. In other words, the foaming agent may be precipitated in the aqueous monomer solution by causing a reaction between the foaming agent precursor and the carbon dioxide gas or acrylic acid salt.

In the present invention, the quantity of foaming agent used with respect to the monomer substances is not limited to any particular quantity, and may be set in accordance with the combination of monomer substances and foaming agent used, etc., but is preferably within a range from 0.001 parts to 10 parts by weight of foaming agent to 100 parts by weight of the monomer substances. If the amount of foaming agent used is not within the foregoing range, the resulting hydrophilic resin (water-absorbent resin) may have unsatisfactory absorption characteristics.

The water content of a hydrogel polymer obtained as above is within a range from 10% to 90% by weight, preferably from 20% to 80% by weight. If the water content is less than 10% by weight, it may be difficult to pulverize the hydrogel polymer, and when the hydrogel polymer contains bubbles, the bubbles may be squashed. On the other hand, a water content greater than 90% by weight is not economical, because drying after pulverization requires too much time.

In the present invention, a hydrophilic resin can be obtained by pulverizing and drying the lumps of hydrogel polymer resulting from the foregoing polymerization. In the present invention, "pulverization" of the hydrogel polymer means disintegration of the lumps of hydrogel polymer to a suitable particle size smaller than their original size, and thus, in the present invention, pulverization includes cracking, granulation, cutting, shredding, etc.

In the method of producing hydrophilic resin according to the present invention, a pulverizer, provided with a pair of spiral rotary blades (feeding blades) with different respective feed rates, is used in pulverizing the hydrogel polymer.

Figure 1:
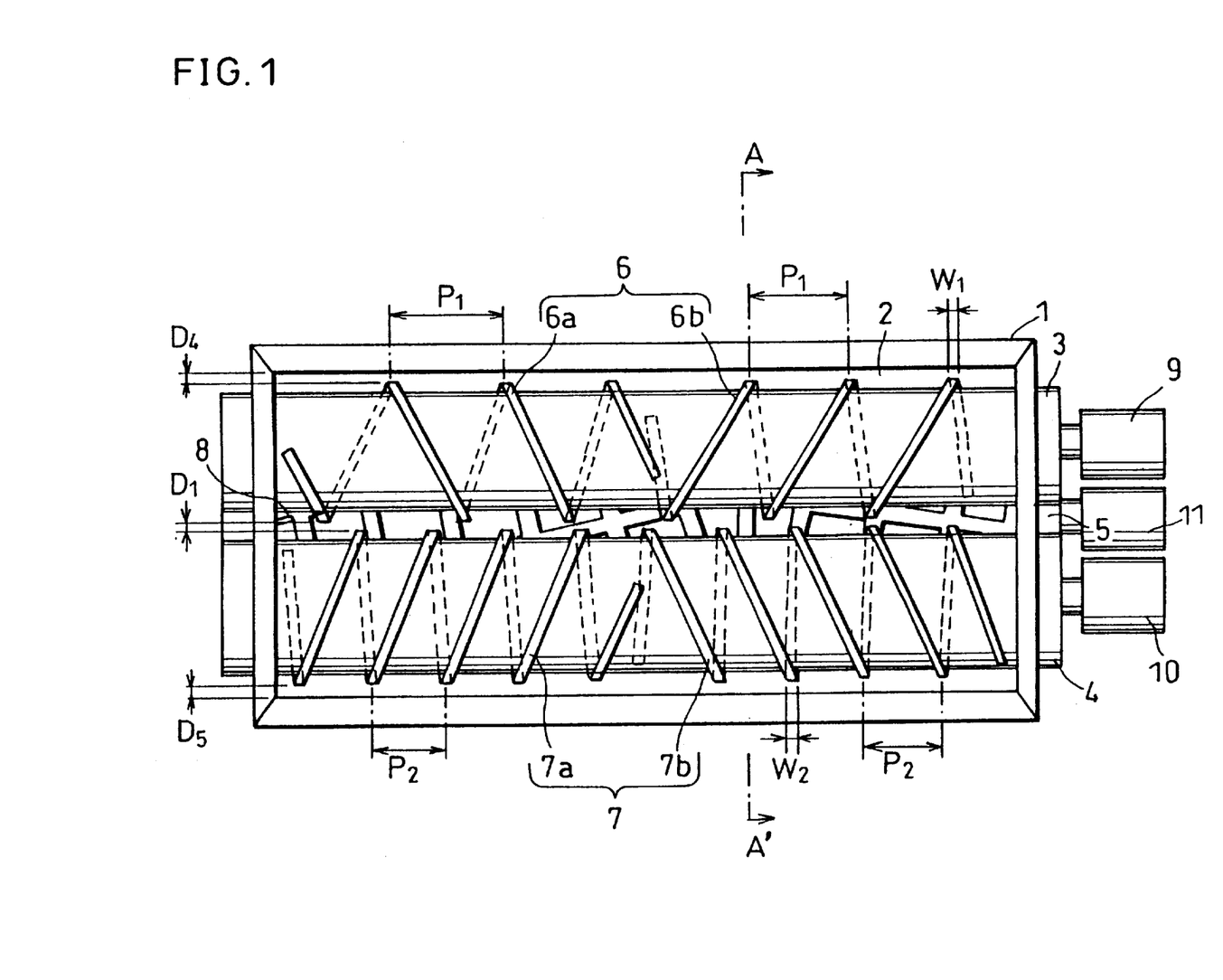
FIG. 1 is a schematic plan view of a pulverizer used in a method of producing hydrophilic resin according to an embodiment of the present invention.

The foregoing pulverizer, as shown, for example, in FIG. 1, includes two rotary blades 6 and 7 provided in the shape of spirals around rotary shafts 3 and 4, respectively. In a pulverizing chamber 2 provided with a hopper 1 (intake) in the upper part thereof, the rotary shafts 3 and 4 are provided parallel to one another with a predetermined interval therebetween, and are rotated independently by driving motors 9 and 10. Further, the rotary blade 6 and the rotary blade 7 are provided such that respective facing surfaces 6c and 7c thereof (shearing surfaces; see FIG. 4) are substantially parallel to each other with a uniform interval therebetween.

The rotary blade 6 is made up of two rotary blades 6a and 6b, having the same spiral pitch $P_1$ but spiral structures of opposite direction, separated at the center of the rotary shaft 3 with respect to the longitudinal axis thereof (the rotary shaft direction). Further, the rotary blade 7 is made up of two rotary blades 7a and 7b, having the same spiral pitch $P_2$ but spiral structures of opposite direction, separated at the center of the rotary shaft 4 with respect to the longitudinal axis thereof (the rotary shaft direction). Further, in the rotary blades 6 and 7, the rotary blades 6a and 7a (opposite one another) and the rotary blades 6b and 7b (opposite one another) are provided so as to have spiral structures of opposite direction.

Accordingly, by rotating the rotary shafts 3 and 4 in opposite directions, the rotary blades 6a and 6b and the rotary blades 7a and 7b perform a feeding action moving toward the center of the rotary shafts 3 and 4 with respect to the longitudinal direction thereof (i.e., toward the place where the direction of the respective spiral structures of the rotary blades 6 and 7 changes). Thus the hydrogel polymer introduced into the hopper 1 is collected at the center of the rotary shafts 3 and 4 with respect to the longitudinal direction thereof. In this way, the spiral directions of the rotary blades 6 and 7 and the rotation directions of the rotary shafts 3 and 4 are set so that the rotary blades 6 and 7 have the same directions of feed due to a screw action, so as to perform a feeding action moving from the ends toward the center of the rotary shafts 3 and 4 with respect to the longitudinal direction thereof.

Further, although the feed directions of the rotary blades 6 and 7 are the same, they are set to different respective feed rates. In other words, the foregoing pulverizer is set such that the feed rate of the rotary blade 6 is greater than the feed rate of the rotary blade 7.

Some methods of attaining the foregoing structure, in which the rotary blade 6 overtakes the rotary blade 7, are, for example, (1) setting the spiral pitch $P_1$ of the rotary blade 6 so as to be greater than the spiral pitch $P_2$ of the rotary blade 7, and rotating the rotary shafts 3 and 4 at the same speed (peripheral speed); (2) setting the spiral pitch $P_1$ of the rotary blade 6 so as to be greater than the spiral pitch $P_2$ of the rotary blade 7, and setting the rotation speed (peripheral speed) of the rotary shaft 3 so as to be greater than the rotation speed (peripheral speed) of the rotary shaft 4; and (3) setting the spiral pitches $P_1$ and $P_2$ of the rotary blades 3 and 4 to the same value, and setting the rotation speed (peripheral speed) of the rotary shaft 3 so as to be greater than the rotation speed (peripheral speed) of the rotary shaft 4. Among the foregoing methods, (1) and (2) are preferred, and when pulverizing a hydrogel polymer in a large mass (for example, one in the form of a sheet, obtained by polymerization at rest), method (2) is more preferred, since it is easier to feed the hydrogel polymer between the rotary blades 6 and 7.

Further, the directions of feed of the rotary blades 6 and 7 do not necessarily have to be the same; in order to increase shearing force, a structure may be used in which the rotary shafts 3 and 4 are rotated so that the directions of feed of the rotary blade 7 and the rotary blade 6 are opposite, and the extruding force of the rotary blade 6 is set so as to be greater than the extruding force of the rotary blade 7, so that the hydrogel polymer is transported toward the center of the rotary shafts 3 and 4 with respect to the longitudinal direction thereof.

In the present invention, the spiral pitches $P_1$ and $P_2$ of the rotary blades 6 and 7 are not limited to any particular pitches, and may be set as needed in accordance with the pulverization conditions other than spiral pitch, such as size of the pulverizer (diameters of the rotary shafts 3 and 4), rotation speed of the rotary shafts 3 and 4, which of the foregoing methods (1) through (3) is used, etc., so that the feed rate of the rotary blade 6 is greater than that of the rotary blade 7. However, in consideration of particle size of the pulverized hydrogel polymer and the efficiency of pulverization, the spiral pitch $P_1$ of the rotary blade 6 is preferably within a range from 5 mm to 300 mm per revolution, more preferably from 10 mm to 250 mm per revolution, and even more preferably from 20 mm to 200 mm per revolution. The spiral pitch $P_2$ of the rotary blade 7, on the other hand, is preferably within a range from 3 mm to 250 mm per revolution, more preferably from 5 mm to 200 mm per revolution, and even more preferably from 10 mm to 150 mm per revolution. If the respective spiral pitches $P_1$ and $P_2$ of the rotary blades 6 and 7 are less than the respective ranges mentioned above, there are cases in which the hydrogel polymer is not pulverized, but is caught within the respective rotary blades making up the rotary blades 6 and 7, i.e., within the spiral pitch. Accordingly, in consideration of the efficiency of pulverization, it is preferable to set the pulverization conditions, such as pulverizer size (diameters of the rotary shafts 3 and 4), rotation speed of the rotary shafts 3 and 4, etc., such that the spiral pitches $P_1$ and $P_2$ fall within the respective ranges mentioned above.

Further, in the present invention, when using either of the methods in (1) or (2) above, in consideration of efficiency of pulverization, it is preferable to set the spiral pitch $P_1$ of the rotary blade 6 within a range, for example, from more than 1 time to no more than 10 times the spiral pitch $P_2$ of the rotary blade 7, more preferably within a range from 1.1 times to 5 times the spiral pitch $P_2$ of the rotary blade 7.

Further, the respective rotation speeds of the rotary shafts 3 and 4 are preferably within a range from 0.05 rpm to 100 rpm, more preferably from 0.1 rpm to 50 rpm. When, as in the methods in (2) and (3) above, the rotary blades 6 and 7 have different respective rotary shaft rotation speeds, a ratio between the peripheral speeds of the rotary blades 6 and 7, i.e., a ratio of the peripheral speed of the rotary shaft 3 to that of the rotary shaft 4 (peripheral speed of rotary shaft 3/peripheral speed of rotary shaft 4) is preferably within a range from 1.1/1 to 50/1, more preferably from 1.1/1 to 20/1. Incidentally, when the rotary shafts 3 and 4 are rotated at the same speed, a structure may be used in which, using a single driving motor, one rotary shaft is rotated in synchronization with the rotation of the other rotary shaft.

In the present invention, in the process of collecting the hydrogel polymer at the center of the rotary shafts 3 and 4 with respect to the longitudinal direction thereof, due to the difference in feed rates of the rotary blades 6 and 7, the rotary blades 6a and 6b cross and overtake the rotary blades 7a and 7b. Thus the rotary blades 6 and 7 bite into and shear the hydrogel polymer.

Figure 3:
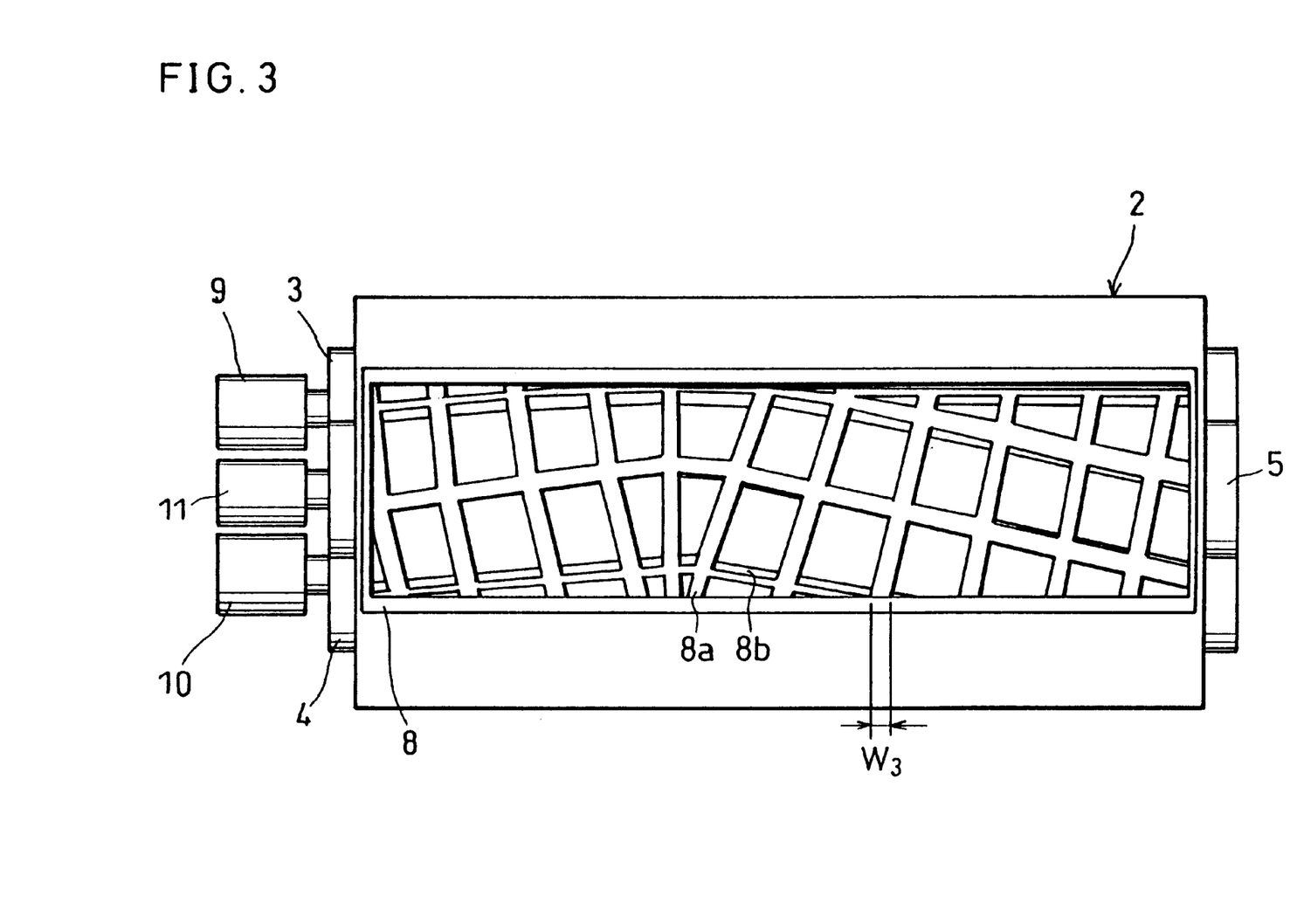
FIG. 3 is a bottom view of the pulverizer shown in FIG. 1.
Figure 4:
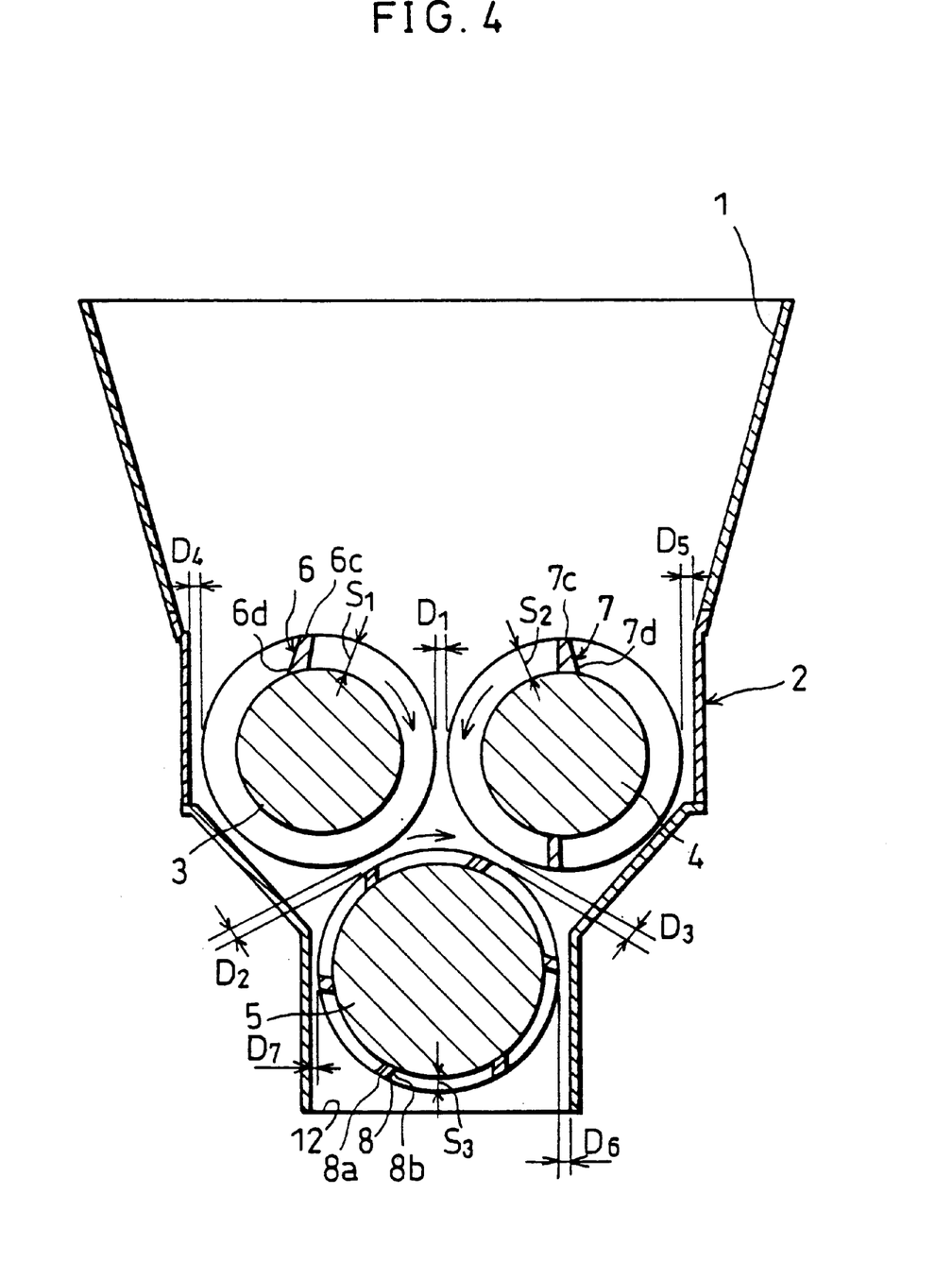
FIG. 4 is a cross-sectional view taken along line A-A' of the pulverizer shown in FIG. 1.

Further, in the foregoing pulverizer, as shown in FIGS. 1, 3, and 4, it is preferable to provide a further spiral rotary blade, for example, between the rotary blades 6 and 7 and an outlet 12 provided at the bottom end of the pulverizing chamber 2 (in the direction of discharge of the hydrogel polymer); in particular, a rotary blade 8 having a grid shape made up of rotary blades with different respective spiral directions, provided on a rotary shaft 5 in the pulverizing chamber 2 below the place where the rotary blades 6 and 7 face one another. In other words, the foregoing pulverizer preferably has a multi-shaft (in the present embodiment, 3-shaft) structure. The spiral pitch of the rotary blade 8, i.e., the length of one side of each square in the grid pattern, is preferably from 5 mm to 200 mm. The rotary blade 8 is provided opposite the rotary blades 6 and 7 such that a facing surface 8a (shearing surface) thereof facing the rotary blades 6 and 7 has a predetermined interval with the corresponding facing surfaces 6c and 7c (shearing surfaces) of the rotary blades 6 and 7. The rotary blade 8 is rotated independently of the rotary blades 6 and 7 by a driving motor 11. Further, the rotary blade 8 and the rotary blades 6 and 7 are provided such that respective facing surfaces thereof (the facing surfaces 8a and 6c, and the facing surfaces 8a and 7c) are substantially parallel to each other with a uniform interval therebetween. By this arrangement, hydrogel polymer which has passed between the rotary blades 6 and 7, in the process of being transported toward the center of the rotary shaft 5 with respect to the longitudinal direction thereof, is caught between the rotary blade 8 and either the rotary blade 6 or the rotary blade 7, and is sheared even more finely where the respective rotary blades cross.

When the foregoing pulverizer has a 3-shaft structure, if the rotary shafts 3 and 4 are rotated at the same rotation speed, a ratio between the peripheral speed of the rotary blade 8 and the peripheral speed of the rotary blades 6 and 7, i.e., a ratio of the peripheral speed of the rotary shaft 5 to that of the rotary shafts 3 and 4 (peripheral speed of rotary shaft 5/peripheral speed of rotary shafts 3 and 4) is preferably within a range from 1/1 to 100/1, more preferably from 3/1 to 50/1. If, on the other hand, the rotary shafts corresponding to the rotary blades 6 and 7 have different respective rotation speeds, a ratio between the peripheral speeds of the rotary blades 8 and 7, i.e., a ratio of the peripheral speed of the rotary shaft 5 to that of the rotary shaft 4 (peripheral speed of rotary shaft 5/peripheral speed of rotary shaft 4) is preferably within a range from 1.1/1 to 100/1, more preferably from 2/1 to 50/1.

In the present invention, an interval $D_1$ between the respective facing surfaces 6c and 7c of the rotary blades 6 and 7 (i.e., the interval where the rotary blades 6 and 7 cross), an interval $D_2$ between the respective facing surfaces 6c and 8a of the rotary blades 6 and 8 (i.e., the interval where the rotary blades 6 and 8 cross), and an interval $D_3$ between the respective facing surfaces 7c and 8a of the rotary blades 7 and 8 (i.e., the interval where the rotary blades 7 and 8 cross) are each preferably set within a range from 0.01 mm to 2 mm, more preferably from 0.05 mm to 0.5 mm. Further, intervals $D_4$ and $D_5$ between the inner walls of the pulverizing chamber 2 and the facing surfaces 6c and 7c of the rotary blades 6 and 7, respectively, and intervals $D_6$ and $D_7$ between the inner walls of the pulverizing chamber 2 and the facing surface 8a of the rotary blade 8 are each preferably set within a range from 0.1 mm to 50 mm, more preferably from 1 mm to 20 mm. The size of the pulverized hydrogel polymer is determined by the intervals $D_1$, $D_2$, and $D_3$. If the intervals $D_1$, $D_2$, and $D_3$ are too large, the hydrogel polymer cannot be finely pulverized. If, on the other hand, the intervals $D_1$, $D_2$, and $D_3$ are less than 0.01 mm, the pulverized hydrogel polymer may be too fine, and pulverization takes too long. For these reasons, it is preferable to set the intervals $D_1$, $D_2$, and $D_3$ within the foregoing range. The intervals $D_4$, $D_5$, $D_6$, and $D_7$ are set so that only the hydrogel polymer pulverized by the rotary blades 6, 7, and 8 can be discharged from the outlet 12 provided at the bottom of the pulverizing chamber 2. Further, of the intervals $D_6$ and $D_7$ between the inner walls of the pulverizing chamber 2 and the rotary blade 8, in order to perform pulverizing and discharge smoothly, it is preferable to set the interval $D_7$ on the side where, in order to further pulverize the hydrogel polymer between the rotary blade 8 and the rotary blades 6 and 7, the rotary blade 8 pushes the hydrogel polymer up, to be smaller than the interval $D_6$ on the side where the rotary blade 8 rotates in the direction of discharge of the hydrogel polymer.

Next, with regard to the sizes of the rotary blades 6, 7, and 8, in consideration of the efficiency of pulverization, it is preferable to set thicknesses $W_1$, $W_2$, and $W_3$ of the rotary blades 6, 7, and 8, respectively (i.e., the respective widths of the facing surfaces 6c, 7c, and 8a; see FIGS. 1 and 3) within a range from 1 mm to 50 mm, more preferably from 2 mm to 30 mm. Further, it is preferable to set heights $S_1$, $S_2$, and $S_3$ of the rotary blades 6, 7, and 8, respectively (i.e., the respective differences between the outer diameters of the rotary blades 6, 7, and 8 and the outer diameters of the rotary shafts 3, 4, and 5; see FIG. 4) within a range from 2 mm to 100 mm, more preferably from 5 mm to 50 mm.

Figure 5:
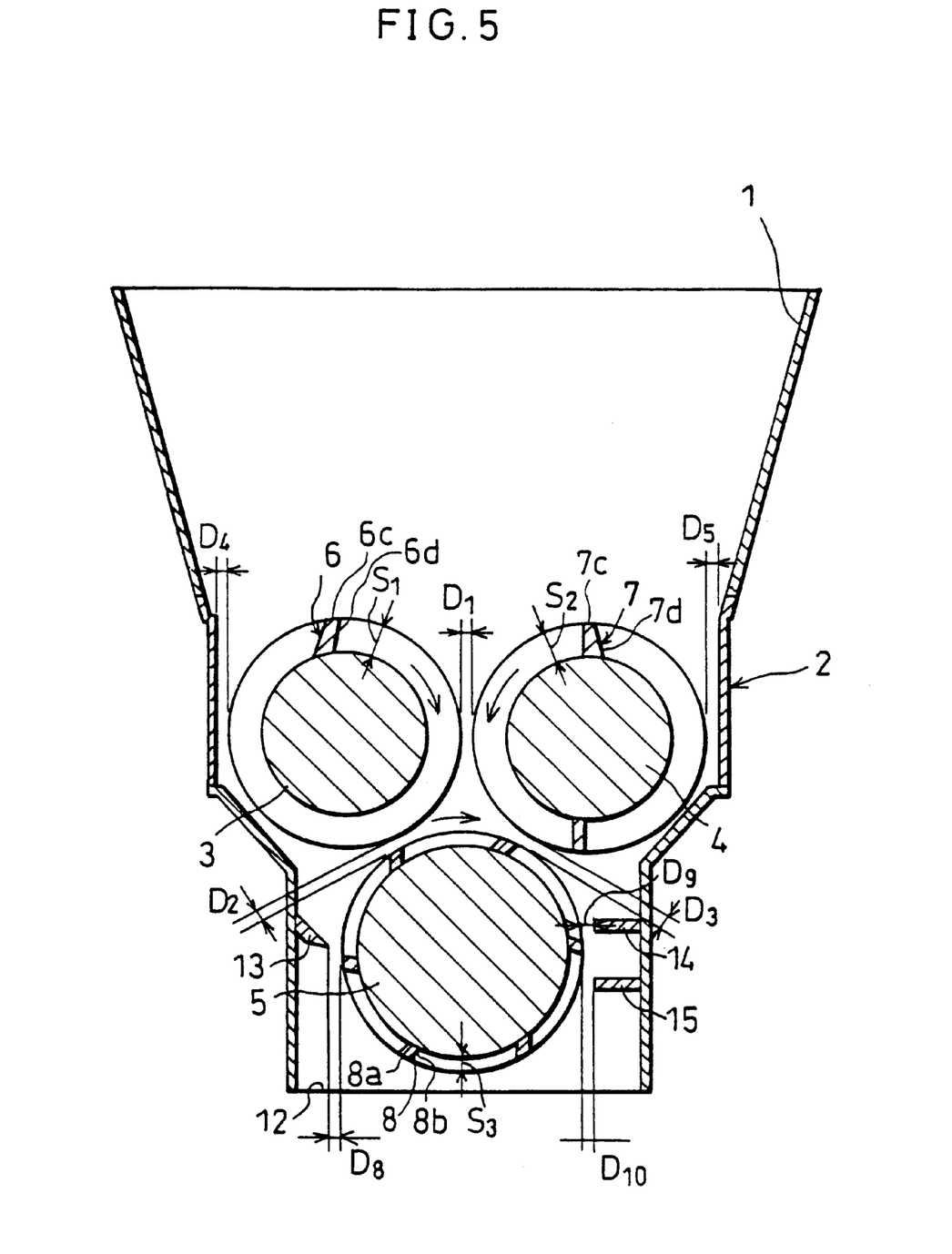
FIG. 5 is a cross-sectional drawing showing an example of provision of fixed blades and a scraper in the pulverizer shown in FIG. 4.

Further, in the vicinity of the area where the rotary blade 8 is provided, it is preferable to further provide, as shown in FIG. 5, a scraper 13 and/or fixed blades 14 and 15. By providing the scraper 13 in the vicinity of the area where the rotary blade 8 is provided, pulverized hydrogel polymer attached to the rotary blade 8 can be separated therefrom and efficiently discharged from the pulverizer. Further, by providing the fixed blades 14 and 15 in the vicinity of the area where the rotary blade 8 is provided, pulverized hydrogel polymer pulverized by the rotating blades 6, 7, and 8 can be further pulverized prior to discharge, by shearing between the rotating blade 8 and the fixed blades 14 and 15. Accordingly, by providing the fixed blades 14 and 15 in the vicinity of the area where the rotary blade 8 is provided, the hydrogel polymer can be pulverized even more finely. When the scraper 13 and/or the fixed blades 14 and 15 are provided in the vicinity of the area where the rotary blade 8 is provided, the size of the pulverized hydrogel polymer is determined by the intervals $D_1$, $D_2$, and $D_3$, and also by an interval $D_8$ between the rotary blade and the scraper 13, an interval $D_9$ between the rotary blade 8 and the fixed blade 14, and/or an interval $D_{10}$ between the rotary blade 8 and the fixed blade 15. Accordingly, it is preferable to set each of the intervals $D_8$, $D_9$, and $D_{10}$ within a range from 0.01 mm to 2 mm, more preferably from 0.05 mm to 0.5 mm. Incidentally, either of the fixed blades 14 and 15 may be omitted.

In the present invention, the temperature of the hydrogel polymer during pulverization is preferably no less than 40° C., and, in view of such considerations as the temperature of the hydrogel polymer during polymerization and temperature change and temperature maintenance of the hydrogel polymer from polymerization to pulverization, the temperature of the hydrogel polymer during pulverization is more preferably within a range from 40° C. to 100° C., and even more preferably from 50° C. to 80° C.

At 40° C. and over, adhesion of the hydrogel polymer is decreased. For this reason, if the hydrogel polymer is pulverized at a temperature within the foregoing range, its adhesion to the rotary blades 6, 7, and 8 is markedly decreased, which minimizes deformation of the hydrogel polymer during shearing, and thus the hydrogel polymer can be pulverized without kneading and crushing, and while retaining more of the bubbles contained therein than in the past.

Further, when the temperature of the hydrogel polymer is within the foregoing range, water vapor is produced from the surface thereof. Consequently, this water vapor becomes attached to the surface of the rotary blades 6, 7, and 8, which further suppresses adhesion of the hydrogel polymer to the rotary blades 6, 7, and 8.

Accordingly, if the hydrogel polymer is caught and sheared between the rotary blades 6 and 7, or between the rotary blade 6 or 7 and the rotary blade 8, within the foregoing temperature range, kneading and crushing of the hydrogel polymer can be markedly decreased, and a hydrophilic resin (water-absorbent resin) can be provided which has even better absorbing performance, such as absorbing capacity. Further, with the foregoing method, since attachment of the hydrogel polymer to the rotary blades 6, 7, and 8 can be suppressed, the hydrogel polymer can be pulverized efficiently and continuously over a long period of time, and deterioration of the rotary blades 6, 7, and 8 can be minimized.

Consequently, in the present invention, it is preferable to pulverize the hydrogel polymer immediately after polymerization, without allowing its temperature to decrease. Further, in order to prevent decrease of the temperature of the hydrogel polymer to less than 40° C., the hydrogel polymer after polymerization may be maintained in a heat retaining chamber wrapped with insulation, etc., or in a chamber or vessel maintained at no less than 40° C. The method of maintaining the temperature of the hydrogel polymer within the foregoing range is not limited to any particular method.

Further, in the present invention, when the temperature of the hydrogel polymer prior to placing in the pulverizer is less than 40° C. (when, for instance, its temperature has decreased to less than 40° C.), it is preferable to adjust the temperature of the hydrogel polymer, by raising its temperature, prior to pulverization. The method of increasing the temperature of the hydrogel polymer is not limited to any particular method; examples of methods which may be used include (1) raising the temperature of the hydrogel polymer in advance using a heating device, etc., and then placing it in the pulverizer and pulverizing; and (2) heating the rotary blades 6, 7, and 8 using a heating device, etc. such as a heater, thus raising the temperature of the hydrogel polymer as it is transported. However, the method in (1) above is preferred, because in this case it is easier to attach water vapor to the rotary blades 6, 7, and 8, and easier to uniformly increase the temperature of the hydrogel polymer.

As the heating device used when heating the hydrogel polymer in advance, a typical dryer or furnace may be used. The dryer is not limited to any particular type; specific examples include channel mixing dryers, rotary dryers, desk dryers, fluidized-bed dryers, gas flow dryers, and infrared dryers.

As discussed above, in the present invention, the hydrogel polymer is pulverized while adjusting and controlling its temperature to no less than 40° C. For this reason, in order to suppress adhesion (attachment) of the hydrogel polymer to the rotary blades 6, 7, and 8, and to prevent deformation of the rotary blades 6, 7, and 8 by heat, it is preferable to form the rotary blades 6, 7, and 8 of a material such as carbon steel, Swedish steel, bearing steel, ceramic, spring steel, powdered high-speed steel, alloy tool steel, cemented carbide, high-speed steel, stellite, stainless steel, or ferrotic steel. Furthermore, in order to suppress adhesion (attachment) of the hydrogel polymer, it is particularly preferable to perform surface treatment (surface treatment to prevent attachment of the hydrogel polymer) of the surfaces of the rotary blades 6, 7, and 8, in particular the surfaces thereof other than the facing surfaces 6c, 7c, and 8a (i.e., sides 6d, 7d, and 8b of the rotary blades 6, 7, and 8, respectively), and of the outer surfaces of the rotary shafts 3, 4, and 5.

The method of surface treatment is not limited to any particular method; specific examples include carbonizing, nitriding, dichromic treatment, atomlloy treatment, redux treatment, polytetrafluoroethylene coating (so-called Teflon coating), tef-lock, tungsten spraying, hard chrome plating, ceramic spraying, and mirror surfacing. Among these, Teflon coating is preferred.

Further, in order to suppress adhesion of the hydrogel polymer and prevent deformation by heat, it is preferable to provide the inner wall (inner surface) of the pulverizing chamber 2 with a base material having a heat deformation temperature higher than the temperature during pulverization of the hydrogel polymer.

Examples of such a base material for the inner surface of the pulverizing chamber 2 include synthetic resins such as polyethylene, polypropylene, polyester, polyamide, fluorine resin, polyvinyl chloride, epoxy resin and silicone resin; and the foregoing synthetic resins strengthened by formation of a complex with an inorganic filler such as glass, graphite, bronze, or molybdenum sulfide, or with an organic filler such as polyimide.

Among the foregoing substances, fluorine resins such as polyethylenetetrafluoride, polyethylenetrifluoride, polyethylenetrifluorochloride, ethylenetetrafluoride-ethylene copolymer, ethylenetrifluorochloride-ethylene copolymer, propylenepentafluoride-ethylenetetrafluoride copolymer, perfluoroalkylvinylether-ethylenetetrafluoride copolymer, and polyvinyl fluoride are especially preferred.

Further, in order to suppress adhesion (attachment) of the hydrogel polymer, it is more preferable to also perform surface treatment (surface treatment to prevent attachment of the hydrogel polymer) of the inner wall (inner surface) of the pulverizing chamber 2. In other words, it is preferable that surface treatment to prevent attachment of the hydrogel polymer be performed on all areas where the hydrogel polymer may become attached.

Further, in the present invention, in order to further suppress attachment of the hydrogel polymer to the rotary blades 6, 7, and 8, in addition to the water vapor produced by the hydrogel polymer, water may be attached to the rotary blades 6, 7, and 8.

Various methods may be adopted to attach water to the rotary blades 6, 7, and 8, such as using an atomizer, etc. to atomize or spray water onto the rotary blades 6, 7, and 8 from above or to the side(s) thereof. Such atomizing, etc. of water may be performed continuously, or at regular intervals.

Figure 2A:
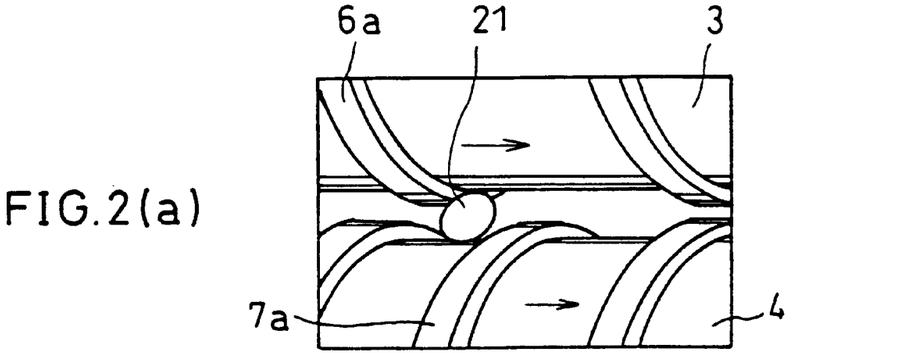
FIGS. 2(a) through 2(d) are explanatory drawings showing operations for pulverizing a hydrogel polymer using the foregoing pulverizer.
Figure 2B:
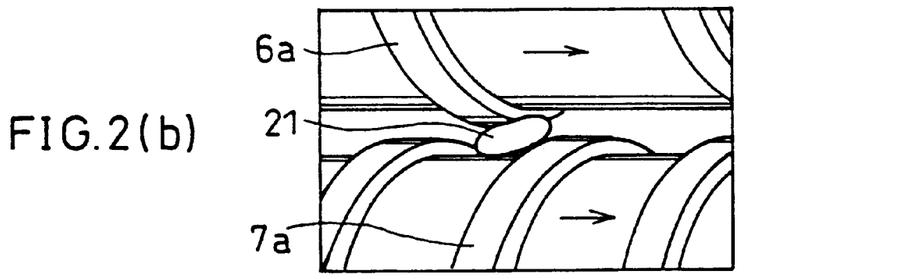
Figure 2C:
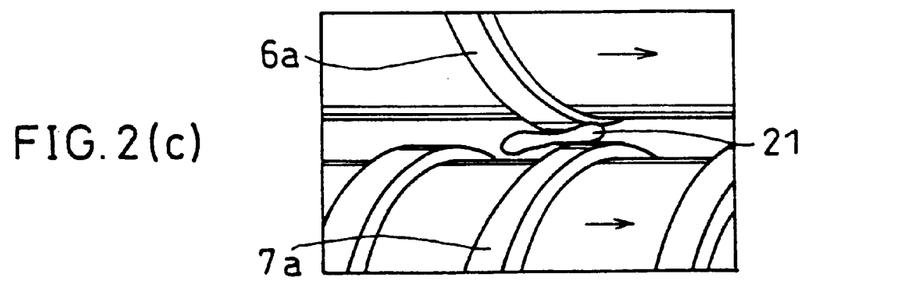
Figure 2D:
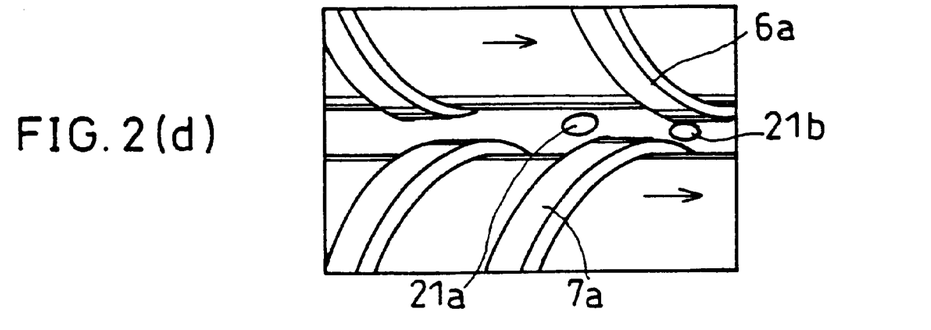

The following will explain, with reference to FIGS. 2(a) through 2(d), operations for pulverizing the hydrogel polymer using the foregoing pulverizer. First, as shown in FIG. 2(a), a lump of hydrogel polymer 21 introduced into the pulverizing chamber 2 through the hopper 1 is transported toward the center of the rotary shaft 3 with respect to the longitudinal direction thereof by the rotation of, for example, the rotary blade 6a. Due to the difference in feed rates of the rotary blades 6a and 7a, the rotary blade 6a catches up to the rotary blade 7a. For this reason, in the process of transporting the hydrogel polymer 21, the distance between the rotary blade 6a and the rotary blade 7a lying in front of the rotary blade 6a is gradually shortened, and, as shown in FIG. 2(b), the hydrogel polymer 21 is caught between the rotary blades 6a and 7a. Then, since the rotary blade 6a crosses (as shown in FIG. 2(c)) and then overtakes (as shown in FIG. 2(d)) the rotary blade 7a, the hydrogel polymer 21 is sheared in two. Then the pieces produced by shearing of the hydrogel polymer 21, for example, pulverized hydrogel polymer pieces 21a and 21b, depending on their orientation during transportation, are either discharged (fall) from between the rotary blades 6a and 7a toward the outlet 12 at the bottom of the pulverizing chamber 2, or are again sheared as the rotary blade 6a behind the pulverized hydrogel polymer pieces 21a and 21b again overtakes the rotary blade 7a, and are then discharged (fall) from between the rotary blades 6a and 7a toward the outlet 12 at the bottom of the pulverizing chamber 2.

Next, the hydrogel polymer which falls between the rotary blades 6 and 7 is further sheared by the rotary blade 8 provided between the rotary blades 6 and 7 and the outlet 12, and is then discharged from the outlet 12. In this way, by adopting the foregoing method, the hydrogel polymer can be sheared a plurality of times prior to discharge, and can thus be efficiently pulverized. Moreover, by first pulverizing the hydrogel polymer to a desired size by the foregoing shearing, drying of the hydrogel polymer can be performed more easily and quickly.

Further, when the temperature of the hydrogel polymer is 40° C. or more, adhesion of the hydrogel polymer is decreased, and water vapor becomes attached to the rotary blades 6, 7, and 8. Consequently, with the foregoing method, the hydrogel polymer, which has high flexibility and is difficult to pulverize, can be pulverized without kneading and crushing, and thus the increase of water-soluble components can be held to a minimum, and transparent pulverized hydrogel polymer can be obtained. Further, if the hydrogel polymer has a crosslinked structure, the resulting high hardness and viscosity can better prevent attachment of the hydrogel polymer to the interior of the pulverizing chamber 2, the surface of the rotary blades 6, 7, and 8, etc., thus making pulverizing even easier. Moreover, with the present invention, even if the hydrogel polymer contains bubbles, these bubbles are not squashed, and thus a water-absorbent resin with a high rate of bubble retention, and with superior absorption characteristics, can be obtained as the hydrophilic resin according to the present invention.

In the present invention, when the hydrogel polymer after pulverization (pulverized matter) is to be dried without further pulverization, the pulverized hydrogel polymer may have any particle diameter at which the particles can be sufficiently dried to their center during the drying step, and is preferably within a range from 0.1 mm to 30 mm, more preferably from 1 mm to 15 mm. Even more preferably, not less than 90% of the pulverized hydrogel polymer has a particle diameter within a range of 1 mm to 5 mm. It is not preferable for the particle diameter of the pulverized hydrogel polymer to be less than 0.1 mm, because silting is likely during drying, which decreases drying efficiency, and because the internal bubbles are squashed. On the other hand, if the particle diameter of the pulverized hydrogel polymer exceeds 30 mm, it is difficult to dry the particles of the hydrophilic resin to the center thereof. Incidentally, when a hydrogel polymer obtained by polymerization in an aqueous solution is in the form of lumps, it is preferable to pulverize this hydrogel polymer into a powder having a predetermined particle diameter.

Again, when the foregoing pulverized hydrogel polymer is to undergo further pulverization (fine pulverization) prior to drying, the pulverized hydrogel polymer is not limited to any particular particle diameter, provided it is of a size which can be introduced into the device used for the further pulverization (fine pulverization), for example within a range from 0.1 mm to 500 mm. As the method of further pulverizing the foregoing pulverized hydrogel polymer, for example, a screw-type extruder such as a meat chopper (Hiraga Kosakusho Co., Ltd. product) or a Dome-Gran (Fuji Paudal Co., Ltd. product), or a cutting mill such as a Rotoplex (Hosokawa Micron Co., Ltd. product) may be used. The particle diameter of the pulverized hydrogel polymer after further pulverization is generally within a range from 0.1 mm to 30 mm, preferably from 1 mm to 15 mm. Even more preferably, not less than 90% of the pulverized hydrogel polymer has a particle diameter within a range of 1 mm to 5 mm.

In the present invention, the pulverized hydrogel polymer obtained by the foregoing pulverization step(s) can be made into hydrophilic resin particles by means of a drying step and, if necessary, a further pulverization step.

The method of drying the hydrogel polymer is not limited to any particular method; various known drying methods may be used, such as hot-air dying, infrared drying, microwave drying, drying using a drum dryer, and azeotropic dehydration in a hydrophobic organic solvent. Moreover, drying conditions may be set as desired so that the solid content of the hydrophilic resin is within a desired range, preferably so that the water content is not more than 10% by weight.

Furthermore, the particle size of the hydrophilic resin according to the present invention may be adjusted by further pulverization or granulation after drying the hydrogel polymer. The average particle diameter of the hydrophilic resin is not limited to any particular diameter, but is preferably within a range from 10 $\mu$m to 2000 $\mu$m, more preferably from 100 $\mu$m to 1000 $\mu$m, and even more preferably from 300 $\mu$m to 600 $\mu$m. It is preferable for the hydrophilic resin to have a narrow particle size distribution. By adjusting the particle size of the hydrophilic resin to within the foregoing range, the various characteristics, such as absorbing performance, can be further improved. Incidentally, the hydrophilic resin particles may have any of various forms, such as spherical, scale-shaped, irregularly broken, and granular.

Further, it is preferable to increase the density of crosslinking near the surface of the hydrophilic resin particles obtained by the foregoing method, by secondary crosslinking of the surface thereof using a surface crosslinking agent. By treating the hydrophilic resin produced by the method according to the present invention using a surface crosslinking agent, liquid permeability, absorption rate, absorbing capacity under pressure, etc. can be further improved.

The surface crosslinking agent may be any compound which has a plurality of reactive groups and is reactive with the functional groups, such as carboxyl groups, of the hydrophilic resin; known surface crosslinking agents generally used for such applications may be used. Specific examples of such surface crosslinking agents include polyhydric alcohols, such as (poly)ethylene glycol, diethylene glycol, (poly)propylene glycol, triethylene glycol, tetraethylene glycol, 1,3-propanediol, dipropylene glycol, 2,2,4-trimethyl-1,3-pentanediol, (poly)glycerin, 2-butene-1,4-diol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylenene block copolymer, pentaerythritol, sorbitol, polyvinyl alcohol, glucose, mannitol, sucrose, and glucose; compounds having two or more epoxy groups, such as ethylene glycol diglycidyl ether, polyethylene glycol diglycidyl ether, glycerol polyglycidyl ether, diglycerol polyglycidyl ether, polyglycerol polyglycidyl ether, and (poly)propylene glycol diglycidyl ether; polyamine compounds, such as ethylenediamine, diethylenetriamine, triethylenetetramine, tetraethylenepentamine, pentaethylenehexamine, and polyethylene imine; compounds having two or more isocyanate groups, such as 2,4-tolylenediisocyanate and hexamethylenediisocyanate; compounds having two or more oxazoline groups, such as 1,2-ethylenebis(oxazoline); alkylene carbonate compounds, such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one; haloepoxy compounds, such as epichlorohydrin, epibromohydrin, and α-methylepichlorohydrin; and polyvalent metal compounds, such as hydroxides and chlorides of polyvalent metals like zinc, calcium, magnesium, aluminum, iron, and zirconium. However, the surface crosslinking agent is not limited to the foregoing examples. A single one of the foregoing surface crosslinking agents may be used alone, or two or more may be used in combination, as needed.

By giving the hydrophilic resin secondary crosslinking using the foregoing surface crosslinking agent, absorbing capacity under applied pressure can be further improved. Further, the content of components which, when they contact the aqueous liquid, elute therein, i.e., so-called water-soluble components, can be held to a minimum. Incidentally, the quantity of the surface crosslinking agent and the temperature and duration of treatment are not particularly limited, and may be set as desired in accordance with the hydrophilic resin, the type or combination of surface crosslinking agents, the desired degree of surface crosslinking, etc.

As discussed above, the method of producing hydrophilic resin according to the present invention is a method of producing hydrophilic resin by pulverizing and drying a hydrogel polymer, in which the hydrogel polymer is pulverized by shearing between two spiral rotary blades with different respective feed rates, provided opposite one another. In the present invention, the temperature of the hydrogel polymer is preferably not less than 40° C. With the foregoing method, the hydrogel polymer gets in between the two spiral rotary blades with different respective feed rates, and, due to the feeding action thereof, is easily fed into the rotary blades. Further, with the foregoing method, due to the different respective feed rates of the rotary blades, one rotary blade overtakes the other, and the hydrogel polymer, caught therebetween, is sheared. For this reason, with the foregoing method, the hydrogel polymer can be pulverized by shearing, thus holding kneading and crushing to a minimum. Accordingly, with the foregoing method, a hydrophilic resin having few water-soluble components and having superior performance, such as absorbing capacity, can be easily obtained. Further, if the temperature of the hydrogel polymer is within the foregoing range, adhesion of the hydrogel polymer is less than when the temperature is outside the foregoing range, and water vapor is produced from the surface of the hydrogel polymer. For these reasons, if the temperature of the hydrogel polymer is adjusted and controlled to within the foregoing range, deformation of the hydrogel polymer can be minimized, thus allowing the hydrogel polymer to be pulverized without destroying its three-dimensional network structure. Consequently, particulate hydrophilic resin can be obtained which has superior absorption characteristics, such as absorbing capacity, absorption rate, and absorbing capacity under applied pressure, and which has a low content of water-soluble components, residual monomers, etc.

In particular, when the hydrogel polymer contains bubbles, destruction of the many bubbles (pores) formed throughout the interior of the hydrogel polymer can be held to a minimum, and thus a porous hydrophilic resin can be obtained by drying and, as necessary, further pulverization. Accordingly, with the method according to the present invention, since a hydrophilic resin can be obtained which has a high bubble content and a larger surface area, a higher absorbing capacity, faster absorption rate, etc. can be attained.

Hydrophilic resins produced by the method according to the present invention have superior absorbing performance, and thus can be suitably used for a variety of purposes, for example sanitary materials (bodily fluid absorbing articles), such as disposable diapers, sanitary napkins, pads for incontinence, wound protecting material, and would healing material; articles for absorbing urine, etc., of pets, for example; construction and building materials, such as building materials and water-retaining material for sandbags, waterproofing material, packing material, and gel water-bags; articles for food, such as drip absorbing material, freshness maintaining material, and cold reserving material; various industrial articles, such as oil/water separating material, material for preventing dew condensation, and coagulant; and agricultural and gardening articles, such as water-retaining material for plants and sandbags.

The following will explain the present invention in further detail by means of concrete Examples and a Comparative Example, but the present invention is not limited in any way thereby. In what follows, performance of water-absorbent resin, as the hydrophilic resin according to the present invention, was measured by the following methods.

(a) Absorbing Capacity

Approximately 0.2 grams of water-absorbent resin was accurately weighed and placed in a 5 cm square tea bag made of non-woven fabric, which was then sealed by heat sealing. Next, the tea bag was submerged in synthetic urine at room temperature. One hour later, the tea bag was removed from the synthetic urine, and, after eliminating a liquid component by placing in a centrifugal separator at 1,300 rpm (equivalent to 250 G) for 3 minutes, the weight $W_1$ (g) of the tea bag was measured. The same operations were performed using a tea bag in which no water-absorbent resin was sealed, and the weight $W_0$ (g) of the tea bag was measured and used as a blank. Absorbing capacity was calculated based on the following equation.

$$\text{Absorbing capacity}(g/g) = \frac{\left(W_1 (g) - W_0 (g) - \text{weight of water-absorbent resin (g)}\right)}{\text{weight of water-absorbent resin (g)}}$$

The composition of the synthetic urine and the content of each component were as follows.

| Composition | Content |
| --- | --- |
| Sodium sulfate | 0.200% |
| Potassium chloride | 0.200% |
| Magnesium chloride hexahydrate | 0.050% |
| Calcium chloride dihydrate | 0.025% |
| Ammonium dihydrogen phosphate | 0.035% |
| Diammonium hydrogen phosphate | 0.015% |
| Deionized water | 99.475% |

(b) Content of Water-Soluble Components 0.5 g of water-absorbent resin was dispersed in 1,000 ml of deionized water, stirred for 16 hours, and then filtered using filter paper. The water-soluble component content (%) was found by colloid-titrating the resulting filtrate using a cationic colloid reagent and measuring the amount of colloid of the water-absorbent resin dispersed in the filtrate.

EXAMPLE 1

A hydrogel polymer made of 75% partially neutralized crosslinked sodium acrylate, with a water content of 39% by weight and a temperature of 55°, was introduced into the pulverizer shown in FIG. 4, and continuously pulverized.

The foregoing hydrogel polymer was pulverized continuously for 24 hours, but almost no attachment of the hydrogel polymer to the rotary blades 6, 7, and 8 was observed, and the pulverized hydrogel polymer was pulverized without kneading.

Then, using a circulating hot air dryer, the pulverized hydrogel polymer was dried for 1 hour at 160° C. Next, the dried hydrogel polymer was further pulverized by a predetermined method, yielding, as a hydrophilic resin according to the present invention, a water-absorbent resin with a predetermined particle diameter. Upon measuring the absorbing capacity and water-soluble component content of the foregoing water-absorbent resin, the absorbing capacity was found to be 42 g/g, and the water-soluble component content was found to be 12.5% by weight.

EXAMPLE 2

First, an aqueous monomer solution was prepared by mixing 134 parts of an aqueous solution containing 37% sodium acrylate by weight, 20 parts acrylic acid, 0.2 parts polyethylene glycol diacrylate (average ethylene oxide (EO) added mol number 8), and 44 parts water. Next, by bubbling nitrogen gas into the aqueous monomer solution, dissolved oxygen was eliminated therefrom.

Then, in a nitrogen gas flow atmosphere, the foregoing aqueous monomer solution was continuously supplied to a driven steel belt polymerizer capable of heating and cooling of the belt surface, such that the depth of the aqueous monomer solution supplied to the top of the belt was 25 mm. The temperature of the aqueous monomer solution at this time was 18° C. Next, as polymerization initiators, an aqueous solution containing 5% 2,2'-azobis(2-methylpropionamidine) dihydrochloride by weight, an aqueous solution containing 0.1% L-ascorbic acid by weight, and an aqueous solution containing 0.07% hydrogen peroxide by weight, were added to the aqueous monomer solution in quantities of 2.0 parts/minute, 1.8 parts/minute, and 2.0 parts/minute, respectively, and mixed therewith by line mixing.

The aqueous monomer solution supplied to the belt commenced polymerization immediately after the foregoing polymerization initiators were added, forming a thick gelatinous substance. Here, the surface of the belt was cooled in a zone thereof up to a point reached when polymerization temperature reached its maximum. Maximum polymerization temperature was 87° C. Thereafter, the gelatinous substance was ripened in a zone heated to 80° C., yielding a transparent hydrogel polymer.

Next, the hydrogel polymer in the form of a sheet, obtained by the foregoing polymerization, was continuously pulverized by continuously introducing it into the pulverizer shown in FIG. 4 at 0.14 m/min. The temperature of the hydrogel polymer prior to pulverization was 60° C. Further, the rotation speed of the rotary blades 6 and 7 was 0.6 rotations/min, and that of the rotary blade 8 was 10 rotations/min.

As a result, almost no attachment of the hydrogel polymer to the rotary blades 6, 7, and 8 was observed during pulverization, and the hydrogel polymer was pulverized without kneading. The average particle diameter of the pulverized hydrogel polymer was within a range from 1 mm to 100 mm, and over 70% thereof was within a range from 50 mm to 100 mm.

Next, the pulverized hydrogel polymer was further pulverized in a meat chopper with a grating of holes 9.5 mm in diameter, and dried in a hot air dryer at 160° C. for 65 minutes. The average particle diameter of the hydrogel polymer after pulverizing in the meat chopper was 2.5 mm.

Thereafter, the dried hydrogel polymer was further pulverized by a predetermined method, yielding, as a hydrophilic resin according to the present invention, a water-absorbent resin with a predetermined particle diameter. Upon measuring the absorbing capacity and water-soluble component content of the foregoing water-absorbent resin, the absorbing capacity was found to be 60 g/g, and the water-soluble component content was found to be 10% by weight.

EXAMPLE 3

A hydrogel polymer was obtained and continuously pulverized by the same operations as in Example 2 above, except that its temperature after polymerization, i.e., temperature prior to introducing into the pulverizer, was 20° C.

As a result, 2 hours after commencement of pulverization, the hydrogel polymer was attached to the rotary blades 6, 7, and 8, and began to accumulate in the pulverizing chamber 2. Part of the accumulated hydrogel polymer had been kneaded to a dough-like consistency.

The hydrogel polymer discharged from the outlet 12, i.e., the hydrogel polymer pulverized by the foregoing method, was dried and further pulverized by the same method as in Example 1 above, and upon measuring the absorbing capacity and water-soluble component content of the resulting water-absorbent resin, the absorbing capacity was found to be 59 g/g, and the water-soluble component content was found to be 10% by weight.

As the foregoing results show, when the temperature of the hydrogel polymer was low, stable pulverization could be performed, provided the duration of pulverization was short, and the resulting water-absorbent resin had a low water-soluble component content, and superior absorbing capacity.

EXAMPLE 4

First, in a reaction vessel provided with a thermometer, a nitrogen gas introducing pipe, etc., an aqueous monomer solution was prepared by mixing 2286 g of an aqueous solution containing 37% sodium acrylate by weight, 216 g acrylic acid, 5.8 g polyethylene glycol diacrylate (average ethylene oxide (EO) added mol number 8), and 1038 g water. Next, by bubbling nitrogen gas into the aqueous monomer solution, dissolved oxygen was eliminated therefrom.

Then 0.5 g of a fluoride surfactant (Fluorad FC-135, a Sumitomo 3M Co., Ltd. product) was added to the aqueous monomer solution, which was then stirred at high speed in a homodisper in a nitrogen gas flow atmosphere, yielding an aqueous monomer solution with nitrogen gas bubbles dispersed therein. The volume of the aqueous monomer solution after dispersing bubbles therein was 1.5 times that of the aqueous monomer solution before dispersion of bubbles. Next, as polymerization initiators, 14 g each of an aqueous solution containing 10% sodium persulfate by weight and an aqueous solution containing 10% sodium hydrogensulfite by weight were added to the aqueous monomer solution.

The aqueous monomer solution commenced polymerization immediately after addition of the foregoing polymerization initiators, and the polymerization temperature reached 90° C. after 15 minutes. Thereafter, the reaction vessel was submerged in a 60° C. hot-water bath for 20 minutes, yielding a hydrogel polymer with bubbles dispersed therein.

Next, the foregoing hydrogel polymer was immediately introduced into the pulverizer shown in FIG. 5, and pulverized. Upon measuring the temperature of the hydrogel polymer prior to introduction into the pulverizer, the temperature thereof was approximately 70° C.

As a result, almost no attachment of the hydrogel polymer to the rotary blades 6, 7, and 8 was observed during pulverization, and the hydrogel polymer was pulverized without kneading. The average particle diameter of the pulverized hydrogel polymer was within a range from 1 mm to 25 mm. Bubbles in the pulverized hydrogel polymer were not squashed, but were retained.

Next, the pulverized hydrogel polymer was dried in a hot air dryer at 160° C. for 1 hour. Thereafter, the dried hydrogel polymer was further pulverized by a predetermined method, yielding, as a hydrophilic resin according to the present invention, a water-absorbent resin with a predetermined particle diameter. Upon measuring the absorbing capacity and water-soluble component content of the foregoing water-absorbent resin, the absorbing capacity was found to be 50 g/g, and the water-soluble component content was found to be 12% by weight. The water-absorbent resin obtained was a porous hydrophilic resin and had a superior absorption rate.

EXAMPLE 5

First, an aqueous monomer solution was prepared by mixing 180 parts of an aqueous solution containing 37% sodium acrylate by weight, 20 parts of an aqueous solution containing 80% acrylic acid by weight, 0.3 parts polyethylene glycol diacrylate (average ethylene oxide (EO) added mol number 8), and 30 parts water. Next, by bubbling nitrogen gas into the aqueous monomer solution, dissolved oxygen was eliminated therefrom.

Then, the aqueous monomer solution was continuously supplied, in a nitrogen gas flow atmosphere, to a driven steel belt polymerizer capable of heating and cooling of the belt surface, such that the depth of the aqueous monomer solution supplied to the top of the belt was 25 mm, and, as polymerization initiators, 1.3 parts of an aqueous solution containing 10% sodium persulfate by weight and 1.3 parts of an aqueous solution containing 0.05% L-ascorbic acid by weight were added to and mixed with the aqueous monomer solution by line mixing. The temperature of the aqueous monomer solution at the time of adding the polymerization initiators was 25° C.

The aqueous monomer solution supplied to the belt commenced polymerization immediately after the foregoing polymerization initiators were added, forming a thick gelatinous substance. Here, the surface of the belt was cooled in a zone thereof up to a point reached when polymerization temperature reached its maximum. Maximum polymerization temperature was 90° C. Thereafter, the gelatinous substance was ripened in a zone heated to 80° C., yielding a transparent hydrogel polymer.

Next, the hydrogel polymer in the form of a sheet, obtained by the foregoing polymerization, was continuously pulverized by continuously introducing it into the pulverizer shown in FIG. 5 at 1 mm/min. The temperature of the hydrogel polymer prior to pulverization was 65° C. Further, the rotation speeds of the rotary blades 6, 7, and 8 were 7 rotations/min, 5 rotations/min, and 12 rotations/min, respectively.

As a result, almost no attachment of the hydrogel polymer to the rotary blades 6, 7, and 8 was observed during pulverization, and the hydrogel polymer was pulverized without kneading, yielding transparent pulverized hydrogel polymer. The average particle diameter of the pulverized hydrogel polymer was within a range from 1 mm to 50 mm.

Next, the pulverized hydrogel polymer was further pulverized in a meat chopper with a grating of holes 13 mm in diameter, and dried in a hot air dryer at 170° C. for 40 minutes. The average particle diameter of the hydrogel polymer after pulverizing in the meat chopper was 2 mm.

Thereafter, the dried hydrogel polymer was further pulverized in a roll mill. Particles that passed through an 850-$\mu$m mesh screen but did not pass through a 150-$\mu$m mesh screen were collected, yielding, as a hydrophilic resin according to the present invention, a water-absorbent resin with a predetermined particle diameter. Upon measuring the absorbing capacity and water-soluble component content of the foregoing water-absorbent resin, the absorbing capacity was found to be 52 g/g, and the water-soluble component content was found to be 5% by weight.

COMPARATIVE EXAMPLE 1

The hydrogel polymer of Example 1 was pulverized using a two-shaft roller-type cutter. The rollers were for the most part unable to bite into the hydrogel polymer, and thus pulverization was nearly impossible. Further, it took time for the rollers to bite into the hydrogel polymer. As a result, the hydrogel polymer obtained by the foregoing method was kneaded to a dough-like consistency throughout.

The resulting hydrogel polymer was dried and further pulverized by the same method as in Example 1, yielding, as a comparative hydrophilic resin, a comparative water-absorbent resin with a predetermined particle diameter. Upon measuring the absorbing capacity and water-soluble component content of the foregoing comparative water-absorbent resin, the absorbing capacity was found to be 40 g/g, and the water-soluble component content was found to be 18.5% by weight.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A method of producing hydrophilic resin by pulverizing and drying a hydrogel polymer, including the step of:
   (a) pulverizing a hydrogel polymer by shearing between a pair of spiral rotary blades with different respective feed rates, provided opposite one another.

2. The method of producing hydrophilic resin set forth in claim 1, wherein:
   of the pair of spiral rotary blades, one of the rotary blades has a spiral pitch greater than a spiral pitch of the other rotary blade, and peripheral speeds of both rotary blades are the same.

3. The method of producing hydrophilic resin set forth in claim 2, wherein:
   of the pair of spiral rotary blades, the spiral pitch of one of the rotary blades is greater than 1 time and no more than 10 times the spiral pitch of the other rotary blade.

4. The method of producing hydrophilic resin set forth in claim 1, wherein:
   of the pair of spiral rotary blades, one of the rotary blades has a spiral pitch greater than a spiral pitch of the other rotary blade, and the rotary blade of greater spiral pitch has a peripheral speed greater than a peripheral speed of the rotary blade of smaller spiral pitch.

5. The method of producing hydrophilic resin set forth in claim 4, wherein:
   of the pair of spiral rotary blades, the spiral pitch of one of the rotary blades is greater than 1 time and no more than 10 times the spiral pitch of the other rotary blade.

6. The method of producing hydrophilic resin set forth in claim 5, wherein:
   of the pair of spiral rotary blades, a ratio of the peripheral speed of the rotary blade of greater spiral pitch to the peripheral speed of the rotary blade of smaller spiral pitch is within a range from 1.1/1 through 50/1.

7. The method of producing hydrophilic resin set forth in claim 1, wherein:
   of the pair of spiral rotary blades, one of the rotary blades has a peripheral speed greater than a peripheral speed of the other rotary blade, and spiral pitches of both rotary blades are the same.

8. The method of producing hydrophilic resin set forth in claim 7, wherein:
   a ratio between the peripheral speeds of the rotary blades is within a range from 1.1/1 through 50/1.

9. The method of producing hydrophilic resin set forth in claim 1, wherein:
   the pair of spiral rotary blades are provided so as to be substantially parallel to each other at a point where the rotary blades cross, with an interval therebetween for shearing of the hydrogel polymer.

10. The method of producing hydrophilic resin set forth in claim 1, wherein:
    spiral directions and rotation directions of the pair of spiral rotary blades are set such that the spiral direction of each rotary blade is reversed in the vicinity of the center thereof with respect to the axis of rotation, and such that the rotary blades perform a feeding action of the hydrogel polymer from the ends thereof with respect to the axis of rotation, toward a point at which the spiral directions thereof are reversed.

11. The method of producing hydrophilic resin set forth in claim 1, wherein said step (a) includes the step of:
    (b) further shearing the hydrogel polymer between at least one of the pair of spiral rotary blades and another spiral rotary blade, provided in a hydrogel polymer discharge direction with respect to the pair of spiral rotary blades.

12. The method of producing hydrophilic resin set forth in claim 11, wherein:
    the third spiral rotary blade, provided in the direction of discharge of the hydrogel polymer from the pair of spiral rotary blades, is a rotary blade having a grid shape made up of rotary blades of different respective spiral directions.

13. The method of producing hydrophilic resin set forth in claim 11, wherein:
    the third spiral rotary blade, provided in the direction of discharge of the hydrogel polymer from the pair of spiral rotary blades, has a peripheral speed greater than or equal to a peripheral speed of the pair of spiral rotary blades.

14. The method of producing hydrophilic resin set forth in claim 11, wherein said step (a) further includes the step of:
    (c) further shearing the hydrogel polymer between the third spiral rotary blade, provided in a hydrogel polymer discharge direction with respect to the pair of spiral rotary blades, and a fixed blade, provided in a direction of discharge of the hydrogel polymer from the third rotary blade.

15. The method of producing hydrophilic resin set forth in claim 11, wherein said step (a) further includes the step of:
    (d) using a scraper to separate from the third spiral rotary blade, provided in the direction of discharge of the hydrogel polymer from the pair of spiral rotary blades, hydrogel polymer attached thereto.

16. The method of producing hydrophilic resin set forth in claim 1, wherein:
    respective surfaces of the pair of spiral rotary blades undergo surface treatment to prevent attachment of the hydrogel polymer thereto.

17. The method of producing hydrophilic resin set forth in claim 16, wherein:
    the surface treatment is polytetrafluoroethylene coating treatment.

18. The method of producing hydrophilic resin set forth in claim 1, wherein:
    in said step (a), the hydrogel polymer has a temperature of not less than 40° C.

19. The method of producing hydrophilic resin set forth in claim 1, wherein:
    the pulverization of the hydrogel polymer in said step (a) is performed which depositing water on the rotary.

20. The method of producing hydrophilic resin set forth in claim 1, wherein:
    the pulverization of the hydrogel polymer in said step (a) is performed such that pulverized matter obtained by pulverization of the hydrogel polymer has particle diameters within a range from 0.1 mm through 500 mm.

21. The method of producing hydrophilic resin set forth in claim 1, wherein:
    the hydrogel polymer has a water content within a range from 10% through 90% by weight.

22. The method of producing hydrophilic resin set forth in claim 1, wherein:
    the hydrogel polymer is a polymer obtained by polymerization of monomer substances, including a water-soluble, ethylenically unsaturated monomer, in the presence of water.

23. The method of producing hydrophilic resin set forth in claim 1, wherein:

the hydrophilic resin is a water-absorbing resin.

24. The method of producing hydrophilic resin set forth in claim 1, wherein:

the hydrogel polymer contains internal bubbles.

25. A method of producing hydrophilic resin, comprising:

driving a pair of spiral rotary blades provided opposite to one another at different feed rates; and pulverizing a hydrogel polymer by feeding the hydrogel polymer into the pair of spiral rotary blades.

26. The method of producing hydrophilic resin set forth in claim 25, wherein a first rotary blade of the pair of spiral rotary blades has a wider pitch than a second rotary blade of the pair of spiral rotary blades, the first rotary blade being rotated a rate equal to or greater than that of the second rotary blade so that the first rotary blade has a greater feed rate than the second rotary blade.

27. The method of producing hydrophilic resin set forth in claim 25, wherein each rotary blade of the pair of rotary blades is comprised of at least two blade portions on a shaft, the blade portions having opposite directions, such that when the shaft is rotated, the blade portions feed the hyrogel polymer in opposite directions.

* * * * *

UNITED STATES PATENT AND TRADEMARK OFFICE
CERTIFICATE OF CORRECTION

PATENT NO.  : 6,140,395
DATED       : October 31, 2000
INVENTOR(S) : Hatsuda et al.

It is certified that an error appears in the above-identified patent and that said Letters Patent is hereby corrected as shown below:

Column 24,
       line 49, change "which" to --while--.

Signed and Sealed this

Eighth Day of May, 2001

*Attest:*

NICHOLAS P. GODICI

*Attesting Officer*     *Acting Director of the United States Patent and Trademark Office*